(No Model.)
G. BOETTLER.
ATTACHMENT FOR STRAW STACKERS.
No. 496,771. Patented May 2, 1893.
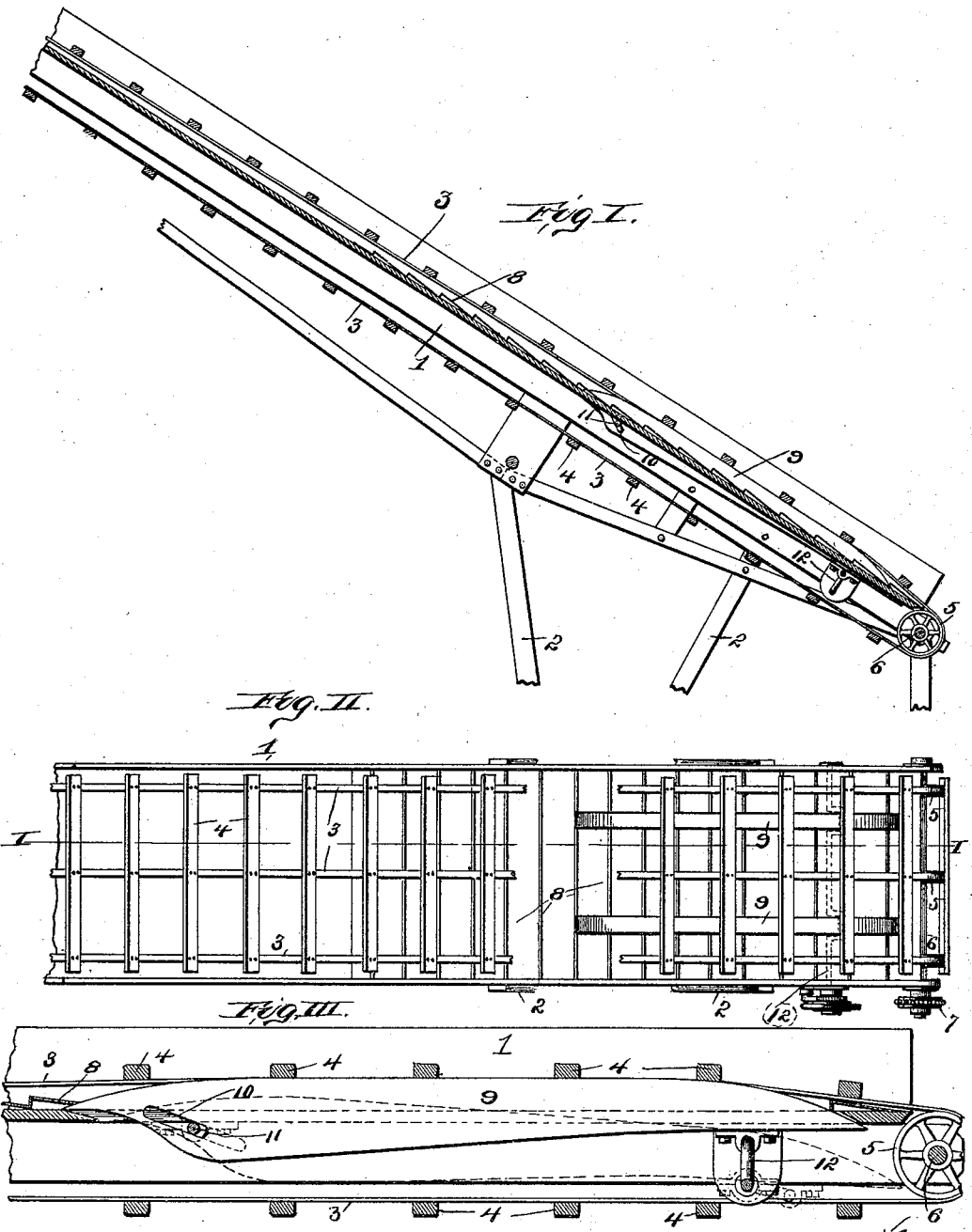

UNITED STATES PATENT OFFICE.

GEORGE BOETTLER, OF ST. CHARLES, MISSOURI.

ATTACHMENT FOR STRAW-STACKERS.

SPECIFICATION forming part of Letters Patent No. 496,771, dated May 2, 1893.

Application filed November 30, 1892. Serial No. 453,565. (No model.)

*To all whom it may concern:*

Be it known that I, GEORGE BOETTLER, of St. Charles, in the county of St. Charles and State of Missouri, have invented a certain new and useful Improvement in Attachments for Straw-Stackers, of which the following is a full, clear, and exact description, reference being had to the accompanying drawings, forming part of this specification.

My invention relates to an attachment for straw-stackers, designed to retain the straw on a straw-stacker, when it falls from the thrashing machine, and further to elevate the slats on the endless carrier at a given point, so that they catch the straw instead of sliding under it, as is frequently the case when the stacker is elevated at a sharp incline; and my invention consists in features of novelty hereinafter fully described and pointed out in the claims.

Figure I represents a vertical section through the straw stacker, and is taken on line I—I, Fig. II. Fig. II is a top view or plan, in which a part of the endless carrier is shown broken out, to more clearly show the retaining device for the straw. Fig. III is an enlarged, detail view of the endless carrier raising strips, the carrier being shown in section.

Referring to the drawings, 1 represents a straw stacker, connected by frame work 2 to the truck of any suitable straw stacker.

3 represents the belts carrying slats 4, such belts and slats comprising the endless carrier. The endless carrier passes around pulleys 5 on a shaft 6 provided with a drive wheel 7. In these parts I claim no invention, as they may be of any desired construction or pattern, and form no part of my invention.

I now come to the description of parts wherein my invention lies. It is well known that in all straw stackers, when the stacker is elevated to a sharp incline, as is required when the stack has reached a considerable height, the straw has a decided tendency to slip downward to the lower end of the stacker, and off, falling to the ground, and by reason of the steep incline, the slats fail to perform their function of carrying the straw, and instead slide under it, thus allowing the straw, if it does not slide from the stacker to remain where it has fallen from the thrasher until it chokes up the space between the thrasher and the stacker. To obviate the described difficulties is the object of my invention. I provide a corrugated or wavy sheet of metal 8 attached to the bed of the stacker, where the straw falls from the thrasher, which forms a holding surface to prevent the straw from sliding downward off the stacker.

9 are strips of wood or other suitable material, loosely mounted on the stacker bed, provided with slots 10 near one end through which pass wires or rods 11, the slot allowing endwise movement of the strips 9, and the pins forming a limit for such movement. The other ends of the strips 9 are loosely mounted upon a rock-shaft 12 journaled to the sides of the stacker. The rock-shaft 12 is provided with a handle by means of which it may be turned to elevate or lower the strips 9. When it is desired to raise the strips into the positions shown in Figs. I and III, the rock shaft is turned by means of its handle, and the strips 9 are pushed forward, and at the same time upward through the action of the inclined slot 10 and the crank of the rock shaft 12.

I claim as my invention—

1. The combination in a straw stacker of an endless carrier and movable strips for raising the endless carrier at a desired point, substantially as described, and for the purpose set forth.

2. The combination, in a straw stacker of a corrugated plate, as 8, an endless carrier and movable strips for the purpose of elevating the endless carrier, substantially as, and for the purpose set forth.

3. The combination in a straw stacker, of the endless carrier and strips located beneath within the endless carrier, and an operating rock shaft therefor, substantially as described, and for the purpose set forth.

GEORGE BOETTLER.

In presence of—
THEO. C. BREUNE,
HENRY H. WILKES.